United States Patent Office 3,078,579
Patented Feb. 26, 1963

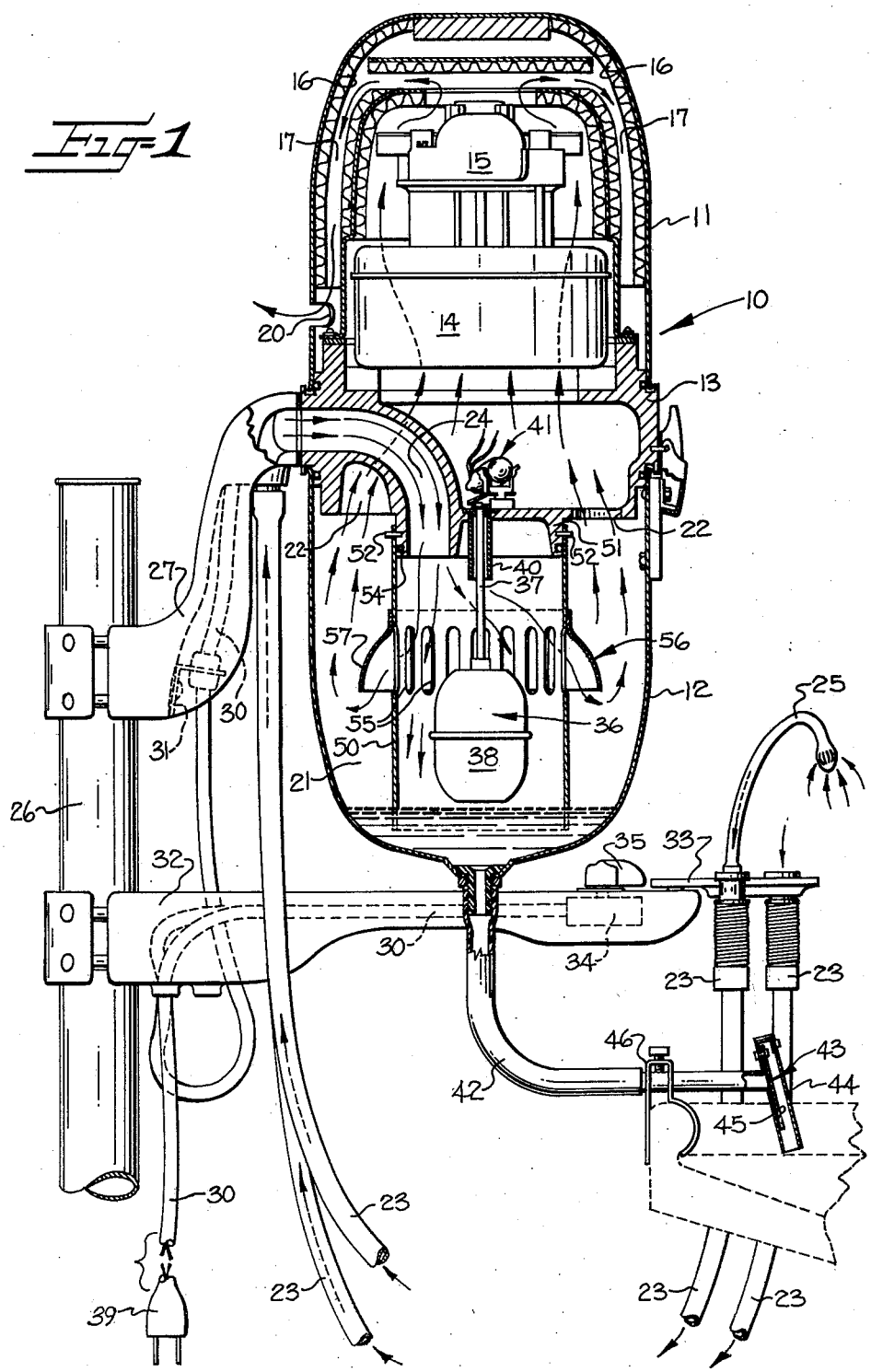

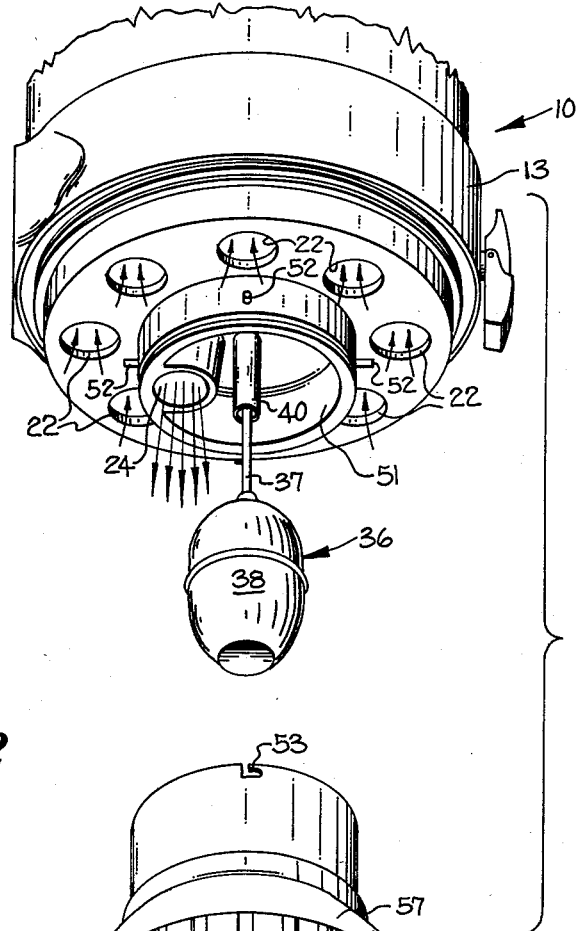

3,078,579
DENTAL ASPIRATOR WITH SPLASH BAFFLE
Arthur L. Jones and Eugene J. Neal, Jr., Charlotte, N.C., assignors to The Pelton & Crane Company, Charlotte, N.C., a corporation of North Carolina
Filed Oct. 28, 1960, Ser. No. 65,777
3 Claims. (Cl. 32—33)

This invention relates to an improved dental aspirator for removing debris, such as broken teeth, bone chips, blood, saliva, etc. from the mouth of a patient to permit the dentist to complete his work without frequent interruptions. More particularly, the present invention concerns a novel splash baffle for incorporation in the waste collection chamber of a dental aspirator to guard against drawing debris-laden air and liquid waste material into the air blower and motor of the dental aspirator.

Dental aspirators commonly provide a housing having a collection chamber therein for receiving waste material from an aspirator conduit, the free end of which is inserted into a patient's mouth to draw out water and debris or foreign matter therefrom because of a suction effect created in the aspirator conduit by a motor-operated air blower mounted in the housing adjacent to the collection chamber, water being commonly dispensed into the patient's mouth for rinsing purposes as the dentist proceeds with his work. The intake side of the blower draws in air from the aspirator conduit and the collection chamber during the operation of the blower to induce a suction effect in the aspirator conduit causing withdrawal of waste material including debris or foreign matter from a patient's mouth through the aspirator conduit. The waste material, which is substantially liquid in form, passes from the aspirator conduit into the waste collection chamber where it accumulates until a valve disposed in a discharge conduit associated with the bottom of the waste collection chamber opens to permit the accumulated waste material to drain from the collection chamber into a suitable receptacle for disposal.

During the operation of such dental aspirators, particles of debris have become lodged in the discharge valve to hold it open when it should normally be closed. Under this condition, air is drawn upwardly at a rapid velocity through the discharge conduit and the valve therefor into the collection chamber by the suction effect created by the blower. The air issuing from the discharge conduit into the collection chamber causes violent agitations of the liquid waste material therein, and an upward spray in the form of a column or fountain of liquid waste material results which is not infrequently drawn into the blower and the motor whereupon flooding of the motor occurs necessitating the stopping of the dental aspirator to effect needed repairs.

The debris-laden waste material in passing from the aspirator conduit into the waste collection chamber during the normal operation of the dental aspirator creates turbulence therein and splashing of the accumulated body of liquid waste material takes place. When this occurs, the splashes of waste material may be caught up in the stream of air currents passing from the waste collection chamber to the intake side of the blower and may be drawn into the blower and its motor. The deposit of waste material in the blower and motor occurring in the manner stated contributes to the deterioration or corrosion of the parts of the blower and motor causing substantial damage thereto, while affecting the efficiency of the blower in creating a suitable suction effect within the aspirator conduit. Moreover, the waste material commonly contains foreign matter subject to decay which creates noxious odors in and around the dental aspirator of a highly unpleasant nature.

It is known to employ a baffle means between the waste collection chamber and the intake side of the blower in the form of a screen of wire mesh to intercept solid particles of waste material attempting to pass with the air currents from the collection chamber to the intake side of the blower during the operation of the dental aspirator. However, the wire mesh screen does not prevent liquid waste material or solid particles of sufficiently small size from passing therethrough. The wire mesh screen is also subject to clogging by the solid particles of waste material which it intercepts, thereby reducing the effectiveness of the air blower in inducing suction in the aspirator conduit of the dental aspirator and creating an unsanitary condition because of the decay of the solid particles of waste material adhering to the screen necessitating frequent cleaning thereof which has proved to be difficult.

It is a primary object of this invention to provide an improved dental aspirator having baffle means in the waste collection chamber thereof substantially eliminating the transmission of waste material, whether liquid or solid in form, into the intake side of the air blower along with the air currents which are drawn through the aspirator conduit and the chamber into the intake side of the air blower during the operation of the dental aspirator, wherein the baffle means in no way affects the efficiency of the air blower in creating suction in the aspirator conduit and requires only infrequent cleaning which may be readily accomplished without difficulty.

It is a more specific object of this invention to provide a splash baffle construction in a dental aspirator of the type having a chamber, a motor-operated blower adjacent to the chamber, means providing air communication between the chamber and the intake side of the blower, and an aspirator conduit extending into the chamber, wherein the splash baffle comprises a sleeve forming a continuation of the aspirator conduit and having a plurality of openings therethrough, and a collar member encircling the sleeve which has an outwardly flared skirt extending in a direction away from the blower and overlying the openings in the sleeve to deflect debris-laden air currents passing through the openings in the sleeve and splashes of liquid waste material away from the blower, whereby the debris is deposited in the collection chamber prior to the passage of the air currents from the chamber to the intake side of the blower and the splashes of liquid waste material are retained in the collection chamber. Sticking or other failure of the discharge valve to close with the consequent formation of the fountain of liquid waste material in the collection chamber as previously described thus is incapable of causing flooding of the motor in a dental aspirator equipped with the splash baffle herein disclosed which intercepts the fountain of liquid waste material as it rises in the collection chamber and deflects it away from the blower and motor.

Some of the objects of the invention having been stated, other objects will appear as the description proceeds when taken in connection with the accompanying drawings, in which—

FIGURE 1 shows a fragmentary elevational view of a dental aspirator constructed in accordance with the present invention, portions thereof being shown in vertical section; and FIGURE 2 is a fragmentary exploded isometric view of the upper housing section, the partition wall, and the splash baffle in the dental aspirator of FIGURE 1.

Referring more specifically to the drawings, the dental aspirator comprises a vertically disposed, canister-like segmental housing 10 having an upper housing section 11 and a lower housing section 18 connected by a central partition wall 13. The partition wall 13 supports an air blower 14 which is operated by an electric motor 15 mounted above the blower 14, the blower 14 and the motor 15 being disposed in the upper housing section 11.

Suitable air permeable sound insulation material 16, which may be fiber glass, rock wool or the like, is packed within the upper housing section 11 in surrounding relationship to the motor 15. Air passageways 17 are preferably provided through the sound insulation material 16, the passageways 17 communicating with openings 20 in the upper housing section 11 for emitting air issuing from the discharge side of the air blower 14 into the atmosphere.

The lower housing section 12 comprises a waste collection chamber 21 separated from the air blower 14 by the partition wall 13, but communicating with the intake side thereof through a plurality of apertures 22 formed in the partition wall 13, as best shown in FIGURE 2.

One or more aspirator conduits 23 (two such aspirator conduits 23, 23 being illustrated in FIGURE 1 of the drawings) extend outwardly from the housing 10 and comunicate with the waste collection chamber 21. In the latter respect, it will be noted that the partition wall 13 is formed with an angular conduit passageway 24 therethrough, the conduit passageway 24 forming a portion of the aspirator conduits 23, 23 and leading into the waste collection chamber 21. In the particular embodiment illustrated in FIGURE 1, one of the aspirator conduits 23, 23 is provided with a curved mouthpiece 25 having air intake openings on its end remote from the dental aspirator housing 10 for comfortable reception within the mouth of a patient, while the other aspirator conduit 23 terminates in an open end to be received in the patient's mouth as an alternative to the aspirator conduit 23 having the mouthpiece 25. It will be understood that the aspirator conduits 23, 23, apart from the angular conduit passageway 24, are constructed of suitable flexible tubing made of material such as rubber, plastic or the like.

The housing 10 is adjustably mounted on a suitable vertical standard 26 by means of a bracket member 27 clampingly received by the vertical standard 26 and rigidly but detachably affixed to the housing 10. The bracket member 27 preferably includes a cavity therein for receiving insulated electrical wiring 30 extending from the motor 15 to protect the wiring 30 from damage, it being noted that an L-shaped holder 31 is mounted within the cavity of the bracket member 27 and provides a leg receiving the wiring 30 through an aperture formed therein to retain the electrical wiring 30 within the cavity of the bracket member 27.

A platform 32 suitable for holding various dental implements is also mounted on the vertical standard 26 spaced below the bracket member 27. It will be seen that the platform 32 includes a holder plate 33 for removably receiving the free ends of the aspirator conduits 23, 23 when not in use and an electric switch means 34 mounted thereon, the switch means 34 being provided with a rotatable indicator knob 35 and being interposed in the electrical wiring 30 for controlling the flow of electrical energy through the electrical wiring 30 to the motor 15. An electrical connector plug 39 is provided on the free end of the electrical wiring 30 for insertion in a suitable electrical outlet to provide a source of electric power for the motor 15.

The motor 15 preferably employed in the dental aspirator is an A.C-D.C. motor of the type utilized in tank-type vacuum cleaners. The normal operating speed of such a motor is relatively high and would tend to create a strong suction effect through the air blower 14 at the free ends of the aspirator conduits 23, 23. The strong suction effect at the free ends of the aspirator conduits 23, 23 is desirable to facilitate drawing the waste material from the patient's mouth and into the waste collection chamber 21 through the particular aspirator conduit in use. However, the rate of air flow from the waste collection chamber 21 to the intake side of the blower 14 is substantially less than the rate of air flow traveling from the angular conduit passageway 24 (forming a portion of the aspirator conduits 23, 23) into the waste collection chamber 21 because of the plurality of apertures 22 in the partition wall 13 which provide communication between the waste collection chamber 21 and the intake side of the air blower 14. In the latter respect, it will be understood that the combined areas of the apertures 22 greatly exceed the cross-sectional areas of the aspirator conduits 23, 23 and that of the angular conduit passageway 24 to cause a substantial reduction in the air flow velocity or rate of air flow from the waste collection chamber 21 to the intake side of the air blower 14 from that occuring in the aspirator conduits 23, 23. The relatively low rate of air flow from the collection chamber 21 to the air blower 14 eliminates any tendency of debris or other waste material to be transmitted from the collection chamber 21 through the apertures 22 and to the air blower 14 with the air currents traveling in that direction.

An actuator float 36 is mounted on the partition wall 13 and depends within the waste collection chamber 21, the actuator float 36 comprising an elongated rod 37 having a bulbous buoyant float 38 affixed to its lower end. The float 38 is adapted to rise in the waste collection chamber 21 in response to the accumulation of waste material therein. The rod 37 of the actuator float 36 is loosely received by a tubular projection 40 extending downwardly from the partition wall 13 and constituting a stop means to limit the upward movement of the bulbous float 38.

The upper end of the elongated rod 37 cooperates with a tiltable vial of mercury comprising a mercury switch 41, being adapted to open the switch 41 by tilting the vial in response to upward movement of the float 38 in the waste collection chamber 21. It will be understood that accumulation of waste material in the collection chamber 21 causes the bulbous float 38 to rise in the chamber 21 and the elongated rod 37 to move into abutment with the tiltable vial of mercury for pivoting the vial to move a globule of mercury contained therein to the opposite end of the vial away from the electrical contacts, thereby causing the opening of the switch 41 to cease operation of the motor 15 and consequently the air blower 14.

Suitable means are provided at the bottom of the collection chamber 21 for discharging accumlated waste material therein from the lower housing section 12 of the dental aspirator, such means being shown as a flexible discharge conduit 42 of suitable material, such as rubber, plastic, or the like, communicating with the bottom of the collection chamber 21 and having a normally closed valve means 43 disposed therein, the valve means 43 being adapted to open in response to a predetermined decrease in the suction effect created by the drawing of air into the intake side of the air blower 14 for permitting the waste material to drain from the collection chamebr 21 through the discharge conduit 42 for disposal purposes. The valve means 43 preferably comprises a valve housing 44 interposed in the discharge conduit 42 in which a flap valve member 45 is mounted for flexing movement about one end affixed to the valve housing 44 into and out of closing position with respect to the discharge conduit 42. The discharge conduit 42 is maintained in a position which will not interfere with the activities of the dentist by a clamp element 46 affixed thereto and removably received on the rim of an appropriate waste receptacle.

The waste collection chamber 21 includes a baffle means in accordance with the present invention as hereinafter described, there being a cylindrical casing or sleeve 50 vertically depending from the partition wall 13 and having a lower open end terminating short of the bottom of the waste collection chamber 21. The cylindrical sleeve 50 is removably affixed to an annular projection mounting 51 extending below the partition wall 13 by suitable fastener means, such as the pin 52 and bayonet slot 53 arrangement shown in the drawings. An annular O-ring seal 54 is preferably received within a suitable groove provided in the external surface of the annular projection mounting 51 for sealing engagement with the cylindrical sleeve 50 to prevent leakage of debris-containing air between the projection mounting 51 and the sleeve 50 in an upward direction toward the air blower 14 and the electric motor 15. The sleeve 50 is positioned so that it forms a continuation of the conduit passageway 24 and hence, the aspirator conduits 23, 23. Intermediate the ends of the sleeve 50, a plurality of elongated slots 55 are formed therein, the slots 55 being arranged in circumferentially spaced parallel relationship to permit the passage of debris-containing air currents drawn through the aspirator conduits 23, 23 therethrough.

Means in the form of a collar member 56 are provided on the sleeve 50, the collar member 56 being secured to the sleeve 50 in encircling relationship and including an annular flared skirt 57 depending outwardly from the sleeve 50 in spaced relationship thereto and in overlying relationship to the plurality of elongated slots 55 formed therein. The sleeve 50 and the collar member 56 may be broadly characterized as splash baffle means, it being understood that the annular skirt 57 serves to deflect the debris-containing air currents passing through the slots 55 away from the air blower 14 toward the bottom of the waste collection chamber 21 so as to deposit the debris in the bottom of the collection chamber 21. Subsequently, the now cleansed air currents are drawn upwardly through the apertures 22 in the partition wall 13 to the intake side of the air blower 14 and thence from the discharge side thereof through the air passageways 17 in the upper housing section 11 and outwardly into the atmosphere through the openings 20 formed therein, it being understood that the plurality of apertures 22 are effective to reduce the rate of air flow to a degree where no waste material, either liquid or solid, will be picked up by the air currents as the air currents travel outwardly of the collection chamber 21.

It should also be understood that splashing caused by the falling of newly-added debris or waste material into the pool of waste material already accumulated in the bottom of the collection chamber 21, wherein particles of debris may rise upwardly in the sleeve 50 cannot cause the upwardly rising debris particles to be incorporated in the air currents passing to the intake side of the air blower 14, inasmuch as the annular skirt 57 on the collar member 56 will deflect such debris particles downwardly toward the pool of accumulated waste material in the chamber 21.

In operating the dental aspirator, the indicator knob 35 is moved to "on" position, thereby completing the electrical circuit of the motor 15 through the switch 34 to energize the motor 15 and operate the air blower 14. This creates a suction effect at the free ends of the aspirator conduits 23, 23, either one of which may be inserted in the mouth of a patient to remove debris therefrom. If the waste material collected in the chamber 21 rises to a level sufficient to cause the rod 37 of the actuator float 36 to pivot the vial of the mercury switch 41 in the manner heretofore described, the switch 41 will be opened to temporarily break the electrical circuit of the motor 15 and consequently stop the blower 14 and the suction effect created thereby for permitting the flap valve member 45 to open. This will allow the collected waste material to drain from the chamber 21 through the discharge conduit 42. Once drainage has been effected, the actuator float 36 drops in the collection chamber 21, and the mercury switch 41 returns to closed position by gravity to resume operation of the motor 15. During the intermittent cycling operation of the dental aspirator, the splash baffle means herein described precludes the transmission of debris or waste material of any kind from the collection chamber 21 to the intake side of the air blower 14. Should a particle of debris lodge between the flap valve member 45 and the valve housing 44 to temporarily prevent the flap valve member 45 from returning to closed position, the rush of air drawn through the discharge conduit 42, as heretofore described, will normally dislodge the debris particle to allow the flap valve member 45 to close while the resulting "fountain" of liquid waste material in the collection chamber 21 will be contained by the cylindrical sleeve 50 or deflected downwardly by the skirt 57 to remain in the collection chamber 21.

In the drawings and specification there has been set forth a preferred embodiment of the invention and, although specific terms are employed, they are used in a generic and descriptive sense only and not for purposes of limitation, the scope of the invention being defined in the claims.

We claim:

1. In a dental aspirator having a housing provided with a chamber for receiving and collecting debris drawn thereinto, a motor-operated blower within said housing adjacent to said chamber, means providing air communication between said chamber and the intake side of said blower, and an aspirator conduit extending outwardly of said housing and communicating with said chamber; the improvement comprising a sleeve disposed within the chamber, said sleeve forming a continuation of said aspirator conduit and being provided with a plurality of slots intermediate its ends, a collar member secured to said sleeve about its exterior surface, said collar member having a flared skirt extending outwardly with respect to said sleeve in a direction away from said blower and overlying said slots in spaced relation thereto, and debris-containing air currents passing from said aspirator conduit into said sleeve and through the slots therein being deflected by said skirt in a direction away from said blower to deposit the debris in said chamber, whereby the debris is prevented from being drawn with the air currents out of the chamber and into the intake side of said blower.

2. In a dental aspirator having a housing provided with a chamber for receiving and collecting debris drawn thereinto, a motor-operated blower within said housing above said chamber, means providing air communication between said chamber and the intake side of said blower, and an aspirator conduit extending outwardly of said housing and communicating with said chamber; the improvement comprising a vertically extending cylindrical sleeve within said chamber forming a continuation of said aspirator conduit, said sleeve being provided with a plurality of circumferentially spaced elongated slots therethrough intermediate the ends of said sleeve, an annular collar member extending about the outer surface of said sleeve and fixedly secured thereto, said collar member having a flared skirt extending outwardly with respect to said sleeve and downwardly away from said blower in spaced overlying relation to said plurality of slots, and debris-containing air currents passing through said aspirator conduit and the slots in said sleeve being deflected by said skirt downwardly away from said blower to deposit debris in the bottom of the chamber, thereby eliminating th debris from the air prior to its movement from the chamber to the intake side of said blower.

3. In a dental aspirator having a housing provided with a chamber for receiving and collecting debris drawn thereinto, a motor-operated blower within said housing adjacent to said chamber, means providing air communication between said chamber and the intake side of said blower, and an aspirator conduit extending outwardly of said housing and communicating with said chamber; the improvement comprising a sleeve disposed within the chamber, said sleeve forming a continuation of said aspirator conduit and being provided with a plurality of slots intermediate its ends, a collar member secured to said sleeve about its exterior surface, said collar member having a skirt extending in a direction away from said blower and disposed in spaced overlying relationship to the slots in said sleeve, and debris-containing air currents passing from said aspirator conduit into said sleeve and through the slots therein being deflected by said skirt in a direction away from said blower to deposit the debris in said chamber, whereby the debris is eliminated from the air currents prior to their movement out of the chamber and into the intake side of said blower.

References Cited in the file of this patent

UNITED STATES PATENTS

| | | |
|---|---|---|
| 1,606,032 | Kolstrand | Nov. 9, 1926 |
| 2,721,620 | Greer et al. | Oct. 25, 1955 |
| 2,821,021 | Winter | Jan. 28, 1958 |